United States Patent [19]

Omar et al.

[11] Patent Number: 5,508,098

[45] Date of Patent: Apr. 16, 1996

[54] TWO-LAYER KNITTED FABRIC FOR ACTIVE AND LEISURE WEAR

[75] Inventors: Ahmad Omar; Hamid Omar, both of Karachi, Pakistan

[73] Assignee: Syntech Fibres (pvt) Ltd., Karachi, Pakistan

[21] Appl. No.: 504,142

[22] Filed: Jul. 18, 1995

[51] Int. Cl.[6] .................................................... B32B 7/00
[52] U.S. Cl. .......................................... 428/254; 428/253
[58] Field of Search ................................... 428/253, 254

[56] References Cited

U.S. PATENT DOCUMENTS

| | | | |
|---|---|---|---|
| 4,530,873 | 7/1985 | Ohada | 428/254 |
| 5,149,583 | 9/1992 | Saarihettu | 428/114 |
| 5,312,667 | 5/1994 | Lumb et al. | 428/254 |

Primary Examiner—James J. Bell
Attorney, Agent, or Firm—Patnaude, Videbeck & Marsh

[57] ABSTRACT

A two-layer weft knitted fabric of a three-thread fleece construction has an inner layer of polypropylene yarn, which is raised to form a fleece, and an outer layer of cotton yarn. The fabric is of a plain plaited structure consisting of a cotton face and binding yarn with a polypropylene backing yarn inlaid and tucked into the technical back of the fabric every fourth wale. In one embodiment, the inner layer of the fabric consists of a repeated sequence of three courses of polypropylene followed by a fourth course of cotton, and in a second embodiment all of the courses of the inner layer are of polypropylene.

10 Claims, 3 Drawing Sheets

TWO-LAYER KNITTED FABRIC FOR ACTIVE AND LEISURE WEAR

The present invention relates to fabrics, and in particular to multi-layered fabrics, the inner layer of which lies against the skin of the wearer and will remain dry, even during heavy activity and sweating of the wearer.

BACKGROUND OF THE INVENTION

Active wear, such as T-shirts, sweatshirts, jogging suits and the like are intended to be worn during periods of heavy activity, such as during sports or exercise. During such activity, the wearer will perspire, and clothing made of cotton or other materials will become saturated with perspiration. When the activity or exercise is extended over a longer period of time, the clothing will be unable to absorb the perspiration from the body, and beads of perspiration will run down the wearer's body inside the garment. As a result, existing active and leisure wear clothing, that is, clothing suitable for use during sports and exercise, will become progressively more uncomfortable to the wearer as the activity is extended.

Knitted fabrics have been developed which have two or three layers of material knitted together, but such fabrics have not resulted in clothing which will be more comfortable during heavy physical activity.

Two examples of existing multi-layer fabrics are Okada, U.S. Pat. No. 4,530,873 and Lumb, U.S. Pat. No. 5,312,667. The fabric disclosed in Okada provides certain moisture absorbing qualities, but includes an outer insulating layer and inner moisture absorbing layers. Garments made from the fabric of Okada will absorb only a certain quantity of moisture but the insulating layer will greatly limit its ability to dissipate moisture through evaporation. It would be desirable to provide a fabric the inner surface of which is adapted to wick large quantities of perspiration during activity and transfer the perspiration to an outer layer away from the body of the wearer.

SUMMARY OF THE INVENTION

Briefly, the present invention is a two-layer weft knitted fabric of a three-thread fleece construction having an inner layer of polypropylene yarn, which is raised to form a fleece, and an outer layer of cotton yarn. In the preferred embodiment, the fabric is of a plain plaited structure consisting of a cotton face and binding yarn with a polypropylene backing yarn inlaid and tucked into the technical back of the fabric every fourth wale. The inner layer of the fabric consists of a repeated sequence of three courses of polypropylene followed by a fourth course of cotton such that the inner layer is between 70 and 85 percent polypropylene and between 15 and 30 percent cotton by weight. The tucked yarns mesh only with the binding yarn, and the face yarn prevents the inlaid tucked yarn from being visible from the face side which is the outer layer of the fabric. The fabric is preferably knitted in a three feeder cycle of a single jersey knitting machine. The completed fabric has an inner side which is approximately 75 percent polypropylene and 25 percent cotton as previously described, and an outer side which is substantially 100 percent cotton. To further increase the moisture wicking qualities of the inner layer, both the polypropylene yarn and the cotton yarn are raised to form a fleece.

The fabric in accordance with the present invention is useful in active and leisure wear outer garments such as sweatshirts, sweatpants, T-shirts, jogging suits, gloves and mittens. The garments are worn such that the raised polypropylene fleece forms an inner layer which contacts the wearer's skin, and the cotton forms the outer layer exposed to the environment. It has been found that the polypropylene fleece in contact with the skin has exceptional moisture wicking qualities which will wick the moisture from the wearer's body away from the surface of the skin toward the outer layer of cotton where it can be evaporated. Because polypropylene also has a very low moisture regain value, the inside of the garment will remain dry even though the outer layer of cotton is soaking wet. As can be seen, garments made of a fabric in accordance with the present invention will be more comfortable than garments of existing fabrics, even after extensive exercise or exposure to rain.

Garments made in accordance with the present invention will inhibit perspiration from running along the inside surface of the garment because the courses of cotton, which represent approximately 25 percent of the inner layer, will capture the beads of moisture and retain them until the polypropylene yarn can wick the moisture to the outer layer of cotton.

GENERAL DESCRIPTION OF THE DRAWINGS

Further objects and advantages and a better understanding of the invention will be had by a reference to the following detailed description taken in conjunction with the accompanying drawings wherein.

DETAILED DESCRIPTION OF THE PREFERRED EMBODIMENT

A fabric in accordance with the present invention is typically knitted in a three feeder cycle of a single jersey circular knitting machine. A three thread fleece construction is used where the three yarns are fed sequentially from separate yarn positions around the cylinder of the machine. The first yarn is the backing or fleece yarn, the second and third yarns are the tie-in and ground yarns which are fed successively in a plaiting relationship and knitted so that the fleece yarn is tucked into the technical back of the fabric every fourth wale. As a result, the fleece yarn is floated on the technical back of the fabric and held in place by the wales of plaited tie-in and ground yarns. This technique hides the fleece yarn from the technical face of the fabric so that it will be exposed only on the back, forming an inner layer. The properties of the two layers are different, yet the two layers are integral and cannot be separated.

Figure 1:
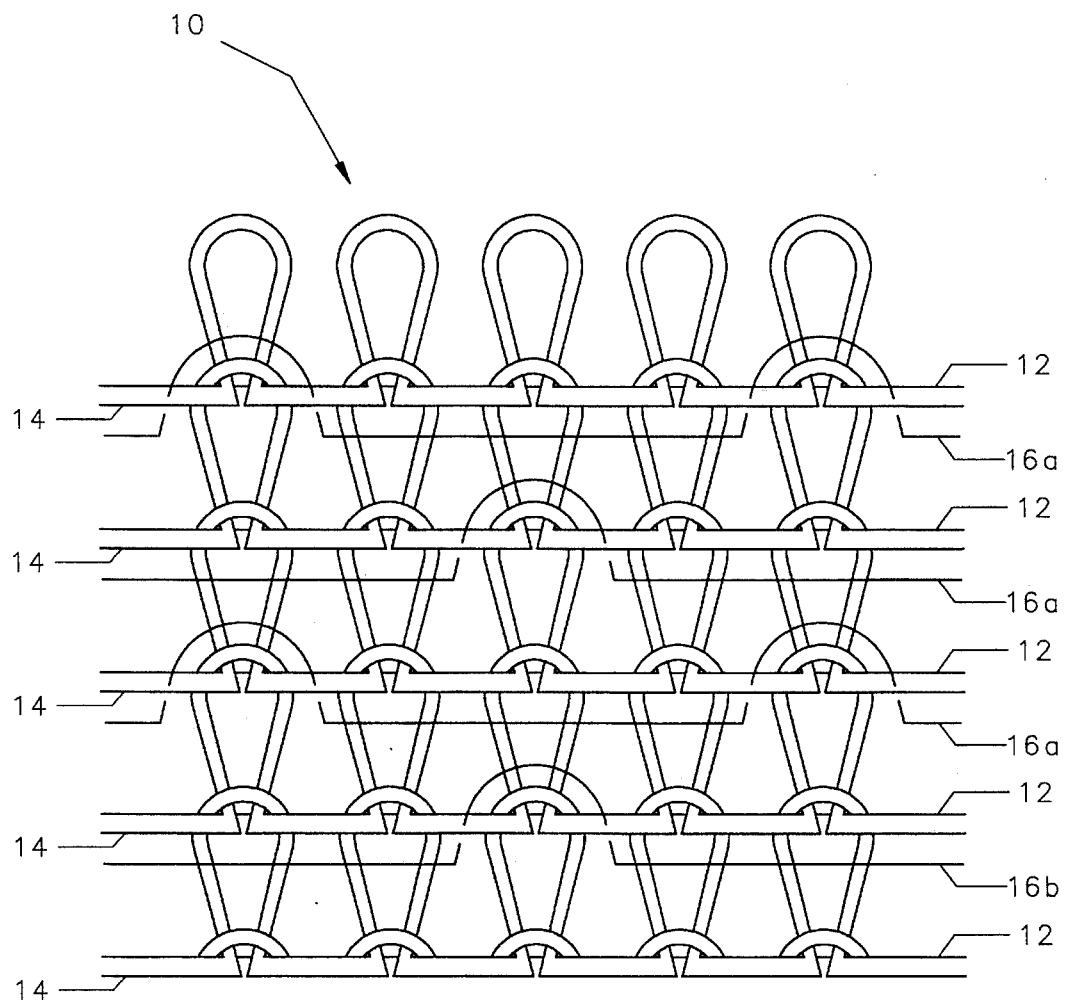
FIG. 1 is a schematic drawing of a three-thread fabric in accordance with the present invention wherein the inside layer consists of 25 percent cotton and 75 percent polypropylene.
Figure 3:
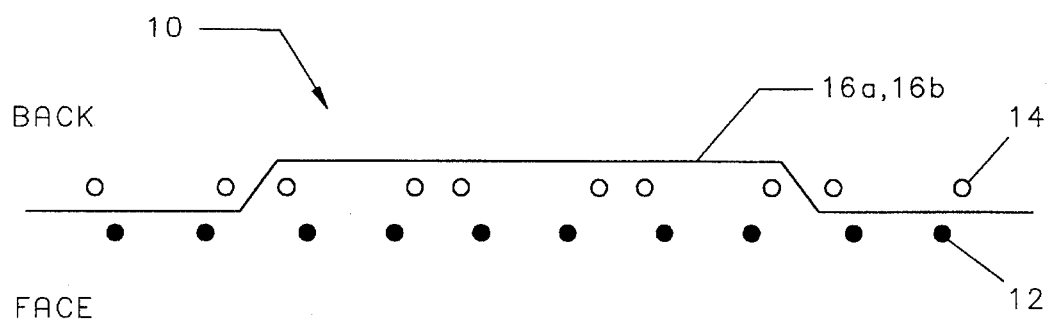
FIG. 3 is a schematic drawing of a cross section of a fabric in accordance with the present invention showing the relative positions of the tie-in, fleece and ground yarn.

Referring to FIGS. 1 and 3, a fabric 10 in accordance with the preferred embodiment has a ground yarn 12 and a tie-in yarn 14 which form the outer layer both of which are 100 percent combed ring spun 30 single English count cotton. The inner layer of the fabric formed by the laid in fleece yarns 16a and 16b has three courses of 100 percent rotor spun 10 single English count polypropylene yarn 16a and a fourth yarn of 100 percent ring spun 20 single English count cotton yarn 16b. The inner layer 16a, 16b is also raised by napping to form a fleece. The end result is an inner layer which contains approximately 85 percent polypropylene and 15 percent cotton. The overall fabric is 75 percent cotton and 25 percent polypropylene.

It should be appreciated that garments of the fabric of the present invention will be breathable because the interlocking layers eliminate the need for a separate lining. The knitted structure is porous and permits the movement of air between the respective layers. Also, sweat and moisture on the skin of the wearer is wicked by the inner layer of the raised polypropylene fibers to the outer cotton layers where it is evaporated. Polypropylene has a moisture regain value of 0.05 percent, and it is, therefore, substantially unable to retain moisture. The cotton layer, on the other hand, has a moisture regain value of 8.00 percent which is 160 times greater than that of the polypropylene. It is the combination of separate yarns of these two materials in close proximity to each other along the inner layer which provides the unique qualities of the present invention.

It is desirable that the cotton yarn used in the inner layer be finer than the adjacent courses of polypropylene yarn such that the outer surface of the inner layer will consist substantially of polypropylene which will be pressed against the skin of the wearer. Garments of the fabric will, therefore, have a dry and comfortable feeling and not be damp when the outer surface is moist. Even though the cotton yarns of the inner layer are finer than the polypropylene yarns, the proximity to the skin of the wearer enables the cotton to absorb and trap quantities of perspiration which would otherwise accumulate on the skin of the wearer in periods of heavy activity and drain along the inside of the garment. The wicking qualities of the polypropylene combine with the absorption and retaining qualities of the cotton to enhance the removal of perspiration and the transfer of the moisture to the outer layer of cotton.

It should also be appreciated that when the outer layer of the fabric in accordance with the present invention becomes wet as a result of rain, the moisture from the rain will not travel to the inner layer of the garment because of the low moisture regain value of polypropylene. As a result, after the outer layer of cotton becomes saturated, further rain will merely run off the surface of the garment and not be transferred to the skin of the wearer.

It should also be appreciated that polypropylene has a thermoconductivity of 6.0 making it an excellent insulator, superior to wool. Unlike wool or cotton, polypropylene does not lose its insulating properties in the presence of moisture, and the fabric provides excellent insulating qualities against cold. These insulating qualities are not lost in rainy weather or during periods of heavy physical activity. Polypropylene is also chemically inert and inherently non-allergenic. Unlike cotton, wool, and other synthetic fibers such as polyester and nylon, polypropylene does not irritate even sensitive skin because of its non-allergenic nature. It is because of these qualities that polypropylene has, in the past, been used as an inner layer for diapers. Furthermore, polypropylene does not retain body odors and resists growth of odor producing mildew, bacteria and other microorganisms.

The outer layer of the fabric of the present invention is 100 percent cotton which can be dyed or printed by conventional methods. Alternately, precolored yarn may be used for the ground and tie-in yarns without inhibiting the qualities of the fabric.

The polypropylene inner layer will not receive a dye, and where white polypropylene is used, the inner layer of the fabric will appear white whereas the outer layer will have the color or print applied to the cotton. When the inner layer of material of the fabric has cotton yarn in every fourth course, as described above, after dying, the inner surface of the fabric will appear striped because color will be absorbed by the cotton course and not by the intervening polypropylene courses.

Figure 2:
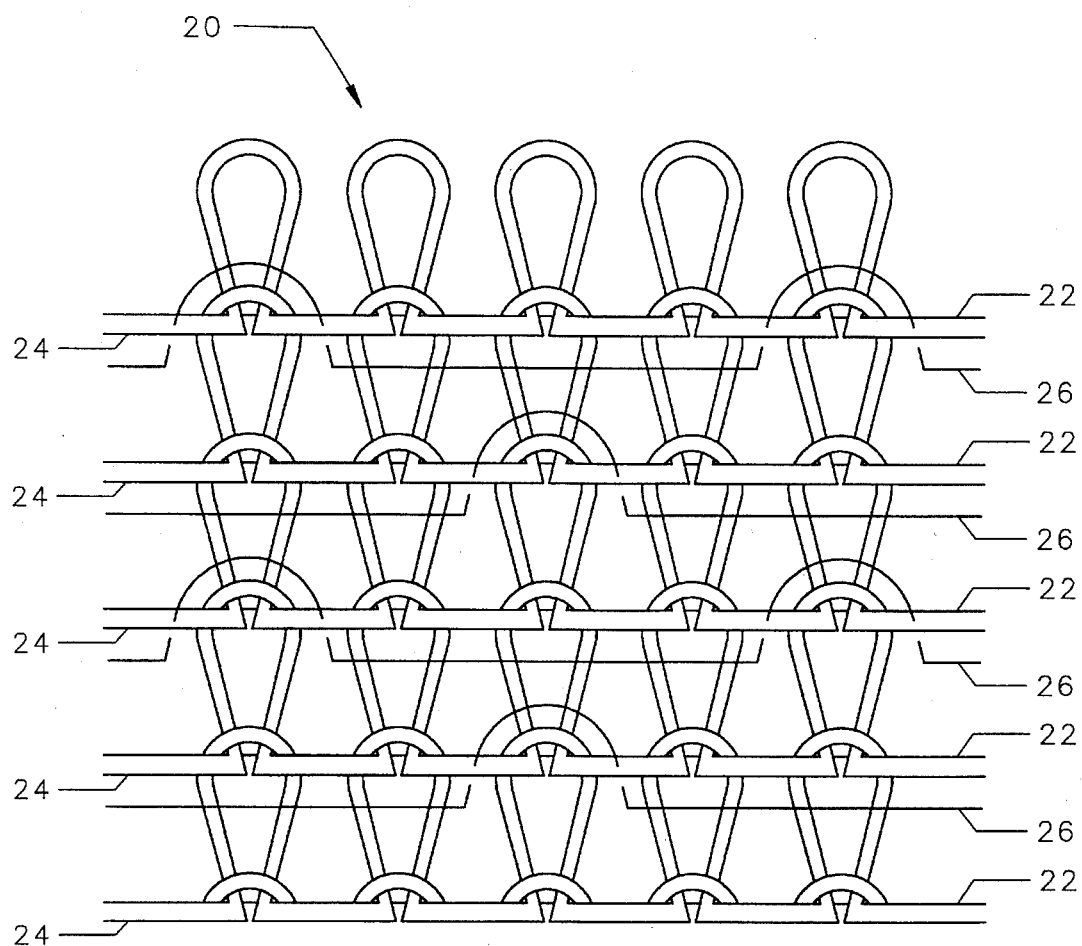
FIG. 2 is a schematic drawing of a three-thread fabric in accordance with the present invention having an inner layer of 100 percent polypropylene and an outer layer of 100 percent cotton.

As shown in FIGS. 1 and 2, the inlaid polypropylene and cotton yarn forming the inner layer of the fabric is tucked into the technical back of the fabric every fourth wale. These could also be tucked into the technical back of the fabric every second, third, fifth or sixth wale, which would alter the thickness of the fleece when the inner layer is raised. The pilling tendency of the fleece will increase with the increase in the number of wales which separate the wales which are tucked into the technical back.

Although it is desirable that the outer layer of the fabric be 100 percent cotton, other yarns may be blended into the cotton, such as viscose, acetate, wool and the like which have different dying characteristics to thereby alter the aesthetic qualities of the fabric. It is desirable that no more than 10 percent of the outer layer be of low water absorbing fibers. Where the outer layer consists of more than 10 percent nylon, acrylic, polyester, or the like, the qualities of the fabric are substantially reduced.

Generally, it is desirable to use rotor spun polypropylene yarn made from 2.8 denier, 1.5 inch staple length polypropylene fiber, however, other yarns may also be used. A 2.8 denier 1.5 inch staple length polypropylene yarn has been found to minimize the pilling of the inner layer, and at the same time provide a fleece which is not too harsh.

Referring further to FIG. 2, in which a second embodiment of a fabric 20 in accordance with the present invention is depicted. As in the first embodiment, the fabric 20 has a ground yarn 22 and a tie-in yarn 24 which form the outer layer of the fabric 20, both of which are 100 percent cotton. The inner layer 26 is tucked into the technical back of the fabric 20 every fourth wale, as in the first embodiment, however, all the courses are 100 percent polypropylene yarn to form the fleece. The fabric 20 will feel dryer to the wearer than the fabric 10 of the first embodiment. On the other hand, during periods of heavy activity, perspiration on the skin of the wearer may accumulate and may run down the body of the wearer because it cannot be wicked to the outer surface as rapidly as the perspiration is produced. The 100 percent polypropylene inner layer is desirable, however, for clothing suitable for cooler weather because of the increased insulating qualities of 100 percent polypropylene.

The yarn count of fabric in accordance with the invention should be selected to make a medium weight fabric of about 280 grams per square meter to maximize the qualities of the fabric for use in both cool and warm weather. Other combinations of yarn count may be used to make the fabric lighter or heavier depending upon the use to which it is to be applied. The fabric weight should be between 200 and 400 grams per square meter.

Figure 4:
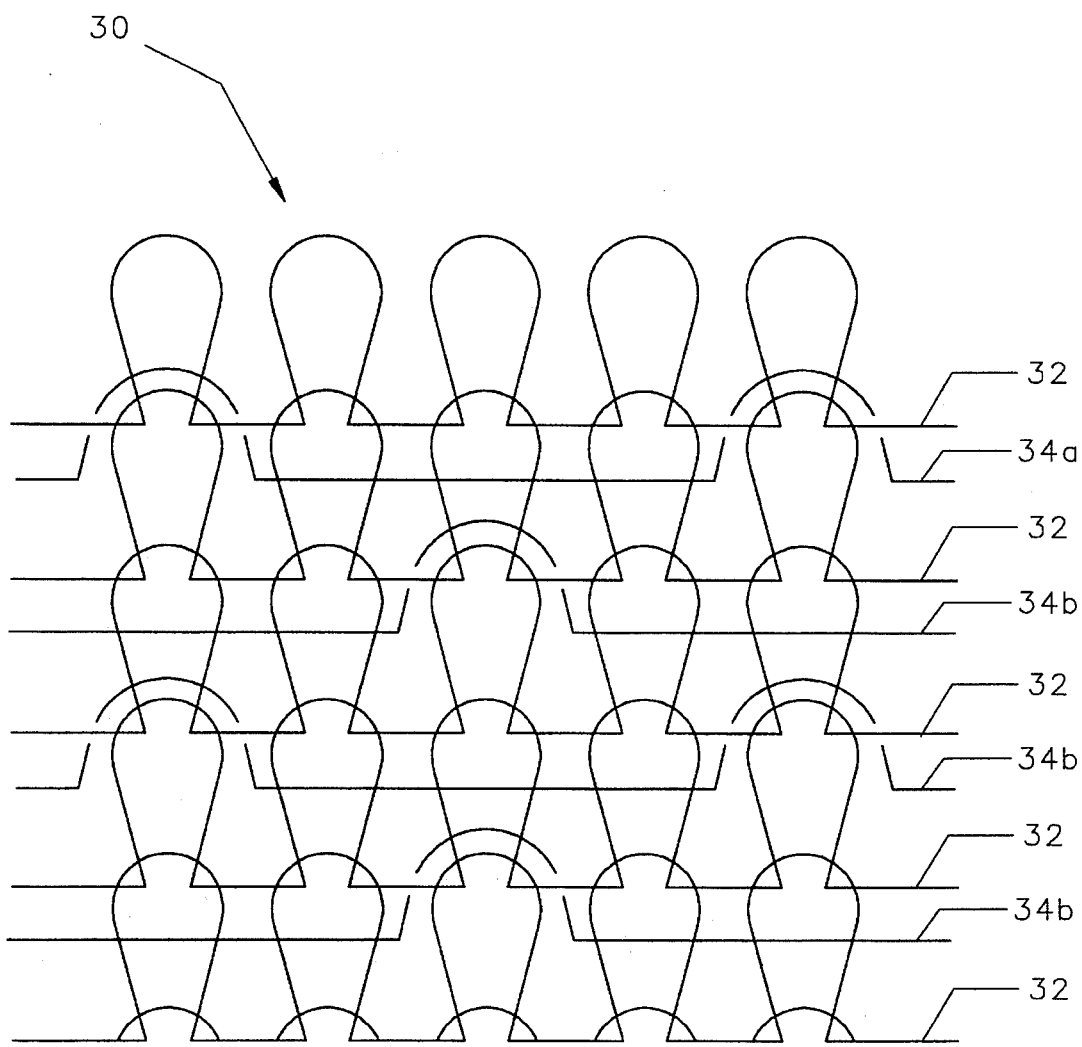
FIG. 4 is a schematic drawing of a two-thread fabric in accordance with the present invention wherein the inside layer is 25 percent cotton and 75 percent polypropylene.

Referring to FIG. 4, in another embodiment of the invention, a two-thread fleece construction is used to form a lighter fabric 30. This embodiment is formed using a cotton ground yarn 32 to form an outer layer, and a second yarn 34 is inlaid into the technical back of the fabric 30 to form an inner layer. The tie-in yarn as shown in FIGS. 1 and 2 are not used in this embodiment. The inner layer 34 may consist of all polypropylene yarn, or, as shown in FIG. 4, every fourth course of the inner layer may be a cotton yarn 34a, and the remaining three courses are polypropylene yarn 34b. In this embodiment, the tucked in polypropylene yarn would be visible from the front and would appear as white flecks in the fabric after the outer cotton layer has been dyed. It should be appreciated that a two-thread fleece fabric would not be as stable as the three thread fleece fabric and would be less desirable.

In order to further illustrate the composite fabric of the invention, the following examples are provided.

EXAMPLE 1

The construction of this example is shown in FIG. 1 in which a three thread fleece construction is knitted on a circular single jersey knitting machine. Both the tie-in yarn and the ground yarn form the outer layer of the fabric are 100 percent combed ring spun cotton of 30 single English count. The inner layer of the fabric is formed by using 100 percent rotor spun 10 single English count polypropylene yarn in three courses, and 100 percent carded ring spun 20 single English count yarn in the fourth course. The fibers of the rotor spun polypropylene yarn were 2.8 denier and 1.5 inch staple length. The alternating use of the polypropylene and cotton yarns for the inner layer of the fabric was repeated through the length of the fabric.

The total weight of the fabric was 280 grams per square meter, the inside layer was 85 percent polypropylene and 15 percent cotton. The outside layer was 100 percent cotton. Overall, the fabric was 75 percent cotton and 25 percent polypropylene.

The fabric was then dyed in a batch dying machine using standard reactive cotton dyes, and the outer layer of the fabric picked up the dye uniformly. On the inside layer only the courses in which cotton were used receive the dye. The polypropylene remained white, giving the inner layer a striped appearance. The inner layer was then raised by brushing to form a fleece. The fabric was then put through a compaction process to control the residual shrinkage. The residual shrinkage of the finished fabric was less than 5 percent in both directions.

EXAMPLE 2

The construction of this example is shown in FIG. 2 in which the inner layer 26 is 100 percent rotor spun 10 English count polypropylene yarn in all the courses, thereby increasing the insulating qualities of the fabric. In this example, both the tie-in yarn and the ground yarn form the outer layer of the fabric were 100 percent combed ring spun cotton of 30 single English count. The total weight of the fabric was 300 grams per square meter. The outside layer was 100 percent polypropylene and the inside layer was 100 percent cotton. Overall, the percentage of cotton was 67 percent and the percentage of polypropylene was 33 percent. After manufacture, the fabric was dyed, raised and compacted as described with respect to example 1, after which the inner layer remained white, and the inner layer accepted the dye uniformly.

While the invention has been described in connection with particular embodiments, it will be understood by those skilled in the art that many changes and modifications may be made without departing from the true spirit and scope of the present invention. Therefore, it is intended by the appended claims to cover all such changes and modifications which come within the true spirit and scope of the invention.

What is claimed:

1. A fabric comprising in combination:
   a first outer knitted fabric layer,
   a second inner fabric layer tucked into the technical back of said first fabric layer,
   said first fabric layer comprising at least 90 percent cotton yarn,
   said second fabric layer of at least 70 percent polypropylene yarn, and
   said second fabric layer having a raised inner surface forming a fleece.

2. The fabric of claim 1 having a three-thread fleece construction wherein said outer layer comprises:
   a ground yarn of at least 90 percent cotton,
   a tie-in yarn of at least 90 percent cotton, and
   said second inner fabric layer comprises repeated sequences of three courses of polypropylene yarns and one course of cotton yarn.

3. The fabric of claim 1 wherein said second fabric layer is tucked into the technical back of said first fabric layer every fourth wale.

4. The fabric of claim 1 wherein said second fabric layer has repeating sequences of three courses of polypropylene yarn and one course of cotton yarn.

5. The fabric of claim 3 wherein said second layer has repeating sequences of three courses of polypropylene yarn and one course of cotton yarn.

6. The fabric of claim 1 having a two-thread fleece construction wherein said outer layer comprises a ground yarn of at least 90 percent cotton, and
   said second inner fabric layer comprises repeating sequences of three courses of polypropylene yarn and one course of cotton yarn.

7. A fabric comprising in combination:
   a first outer knitted fabric layer,
   a second inner fabric layer tucked into the technical back of said first fabric layer,
   said first fabric layer comprising at least 90 percent cotton yarn,
   said second fabric layer comprising approximately 100 percent polypropylene yarn, and
   said second fabric layer having a raised inner surface forming a fleece.

8. The fabric of claim 7 having a three-thread fleece construction wherein said outer layer comprises:
   a ground yarn of at least 90 percent cotton, and
   a tie-in yarn of at least 90 percent cotton.

9. The fabric of claim 7 wherein said second fabric layer is tucked into the technical back of said first fabric layer every fourth wale.

10. The fabric of claim 7 having a two-thread fleece construction wherein said outer layer comprises a ground yarn of at least 90 percent cotton.

* * * * *